United States Patent
Hardee et al.

(10) Patent No.: US 10,657,266 B2
(45) Date of Patent: May 19, 2020

(54) METHODS AND SYSTEMS FOR RENDERING HOLOGRAPHIC CONTENT IN A FIRST OR SECOND MODE BASED ON SECURITY CLEARANCE

(71) Applicant: INTERNATIONAL BUSINESS MACHINES CORPORATION, Armonk, NY (US)

(72) Inventors: Christopher J. Hardee, Raleigh, NC (US); Shikhar Kwatra, Morrisville, NC (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 15/704,158

(22) Filed: Sep. 14, 2017

(65) Prior Publication Data
US 2019/0080097 A1 Mar. 14, 2019

(51) Int. Cl.
| | |
|---|---|
| *G06F 21/55* | (2013.01) |
| *G06F 21/60* | (2013.01) |
| *G06F 21/62* | (2013.01) |
| *G06F 21/74* | (2013.01) |
| *G03H 1/04* | (2006.01) |
| *G06F 16/535* | (2019.01) |
| *G06F 16/735* | (2019.01) |
| *G06F 21/84* | (2013.01) |
| *G03H 1/00* | (2006.01) |
| *G06F 16/783* | (2019.01) |

(52) U.S. Cl.
CPC .......... *G06F 21/60* (2013.01); *G03H 1/0011* (2013.01); *G06F 16/535* (2019.01); *G06F 16/735* (2019.01); *G06F 21/554* (2013.01); *G06F 21/629* (2013.01); *G06F 21/6245* (2013.01); *G06F 21/74* (2013.01); *G06F 21/84* (2013.01); *G03H 2001/0016* (2013.01); *G03H 2001/0022* (2013.01); *G06F 16/7844* (2019.01); *G06F 2221/032* (2013.01); *G06F 2221/2111* (2013.01)

(58) Field of Classification Search
CPC ........ G03H 1/0011; G03H 2001/0016; G03H 2001/0022; G06F 16/435; G06F 16/535; G06F 16/735; G06F 21/554; G06F 21/62–629; G06F 21/74; G06F 2221/032; G06F 2221/2111; G06F 21/84
USPC .......................................................... 359/2
See application file for complete search history.

(56) References Cited

U.S. PATENT DOCUMENTS

| | | | |
|---|---|---|---|
| 3,620,590 A | * 11/1971 | Barker | G03H 1/041 380/54 |
| 6,512,607 B1 | 1/2003 | Windsor et al. | |
| 8,955,147 B2 | 2/2015 | Lee et al. | |
| 9,330,267 B2 | 5/2016 | Abe et al. | |

(Continued)

*Primary Examiner* — Ryan S Dunning
(74) *Attorney, Agent, or Firm* — Griffiths & Seaton PLLC

(57) ABSTRACT

Embodiments for rendering holographic content by one or more processors are described. A security level associated with holographic content is determined. A security clearance associated with a viewer within a proximity of a holographic display is determined. The holographic content is caused to be rendered in a first mode or a second mode by the holographic display based on the determined security level associated with the holographic content and the determined security clearance associated with the viewer.

15 Claims, 16 Drawing Sheets

(56) References Cited

U.S. PATENT DOCUMENTS

| | | |
|---|---|---|
| 9,600,688 B2 | 3/2017 | Buck |
| 9,661,272 B1 * | 5/2017 | Daniel .................... H04N 7/15 |
| 2002/0096985 A1 * | 7/2002 | Hazzard .................. G02B 5/32 |
| | | 313/112 |
| 2011/0321143 A1 * | 12/2011 | Angaluri, Sr. ....... H04N 9/3194 |
| | | 726/6 |
| 2014/0201844 A1 * | 7/2014 | Buck ...................... G06F 21/50 |
| | | 726/26 |
| 2016/0224106 A1 | 8/2016 | Liu |

\* cited by examiner

METHODS AND SYSTEMS FOR RENDERING HOLOGRAPHIC CONTENT IN A FIRST OR SECOND MODE BASED ON SECURITY CLEARANCE

BACKGROUND OF THE INVENTION

Field of the Invention

The present invention relates in general to computing systems, and more particularly, to various embodiments for rendering holographic content.

Description of the Related Art

Rendering content on electronic devices, such as stationary computers and various mobile devices (e.g., laptops and cellular phones), often presents users with difficulties in ensuring that confidential or sensitive information is not (and/or can not) be viewed by unauthorized people. For example, when utilizing a mobile device, such as a tablet computer, in a public place, such as an airport or restaurant, depending on the orientation of the mobile device, the user may not be able to ensure that other people cannot see what is being displayed on their device.

This is particularly a concern with the advent of the use of holographic displays, regardless of the environment in which they are utilized. That is, because holographic displays render content in a three-dimensional manner, it may be significantly more difficult to prevent unauthorized viewers from seeing the content, as it generally may be relatively easily seen regardless of the orientation of the display and/or the angle from which the content is viewed.

SUMMARY OF THE INVENTION

Various embodiments for rendering holographic content by one or more processors are described. A security level associated with holographic content is determined. A security clearance associated with a viewer within a proximity of a holographic display is determined. The holographic content is caused to be rendered in a first mode or a second mode by the holographic display based on the determined security level associated with the holographic content and the determined security clearance associated with the viewer.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
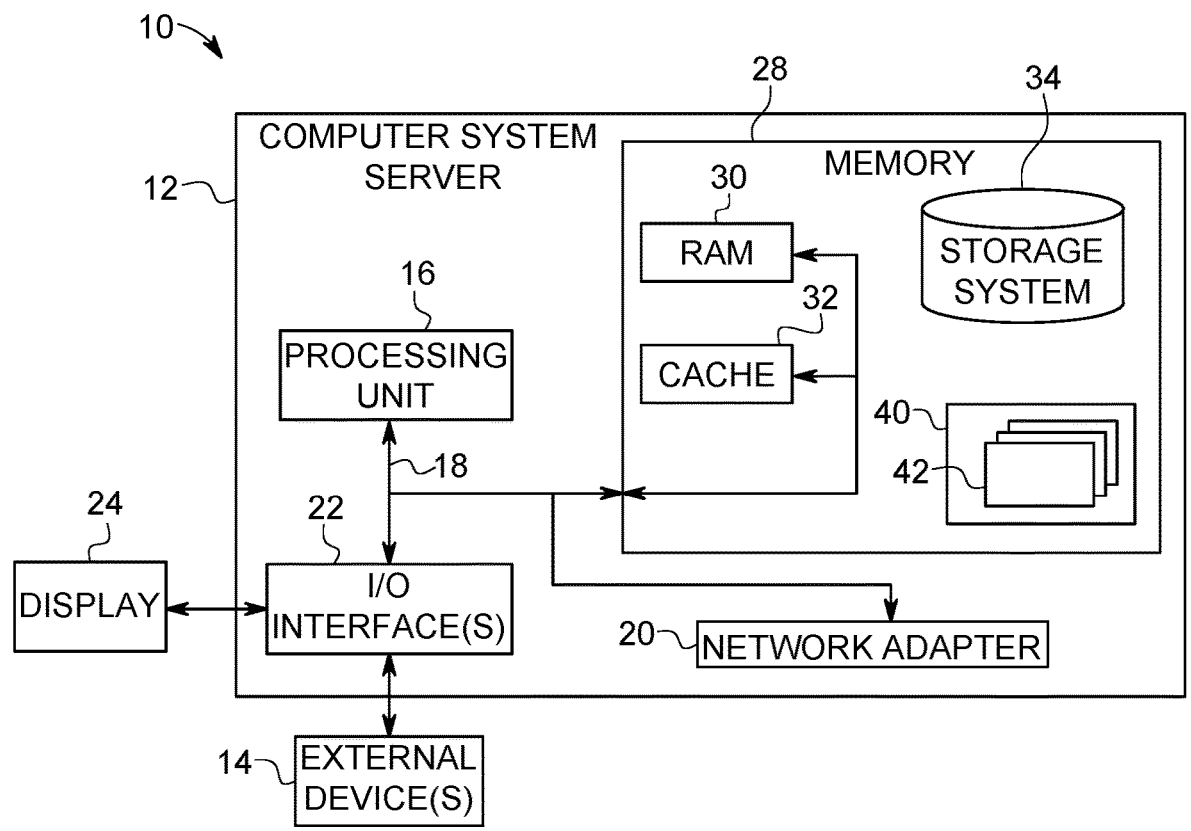
FIG. 1 is a block diagram depicting an exemplary computing node according to an embodiment of the present invention.

As discussed above, rendering content on electronic devices, such as desktop computers and various mobile devices, often presents users with difficulties in ensuring that confidential or sensitive information is not (or can not) be viewed by unauthorized people. This is particularly a concern with the advent of the use of holographic displays because the content is rendered in a three-dimensional manner and generally may be seen regardless of the orientation of the display and/or the angle from which the content is viewed.

For example, consider a scenario in which a mobile device, such as a tablet computer or cellular telephone equipped with a holographic display, is being used to render sensitive content (e.g., confidential information) in a public location, such as a coffee shop. If the device is placed flat on a table, the three-dimensional content may generally be projected (or generated) above the device, which would typically allow for anyone within a certain distance of the device to see it. While it may be possible for the user to manually devise some sort of physical obstruction to prevent unwanted viewers from seeing the content, at least from particular angles, it would be difficult for the user to ensure that the obstruction is sufficiently blocking the view of all possible unwanted viewers in the vicinity.

As another example, consider an office or workplace environment with a larger holographic display (e.g., in a conference room). Although it may be possible to limit access to that particular area (or room) to authorized personnel when sensitive content is being displayed by the holographic display, depending on the exact nature or style of the workplace (e.g., glass walls, an "agile" workplace, etc.), it may be difficult to prevent unauthorized viewers (e.g., visitors) from having a line of sight to the content.

In view of the foregoing, a need exists for methods and systems that provide for the rendering of holographic content in such a way to decrease the likelihood that any unauthorized viewers are able to clearly see/view sensitive or confidential content.

To address these needs, embodiments described herein provide methods and systems for rendering holographic content in different manners (or modes) based on, for example, the presence of (potential) viewers within a proximity (e.g., a predetermined distance) of a holographic display, the direction(s) in which such viewers are gazing, the identity of the viewers, and/or a security clearance associated with the viewers. For example, in some embodiments, when a potential viewer (e.g., an individual within a predetermined distance of the holographic display) is detected (e.g., via one or more sensors), a security clearance associated with the viewer is determined (e.g., based on an identification of the viewer) and compared to a security level (or condition) associated with holographic content being rendered (and/or about to be rendered) by the holographic display.

Based on the comparison, signals to control and/or adjust the manner in which the holographic display is rendering (and/or is about to render) the holographic content are generated. If the viewer is determined to be unauthorized to view the holographic content, the holographic content (e.g., relatively sensitive holographic content) is rendered in such a way that it is at least partially obfuscated or obstructed from the view of the viewer.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, holographic displays, computing devices equipped with holographic displays, such as personal computer systems, hand-held or laptop devices, and network PCs, and/or various other devices, such as sensors (e.g., cameras). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
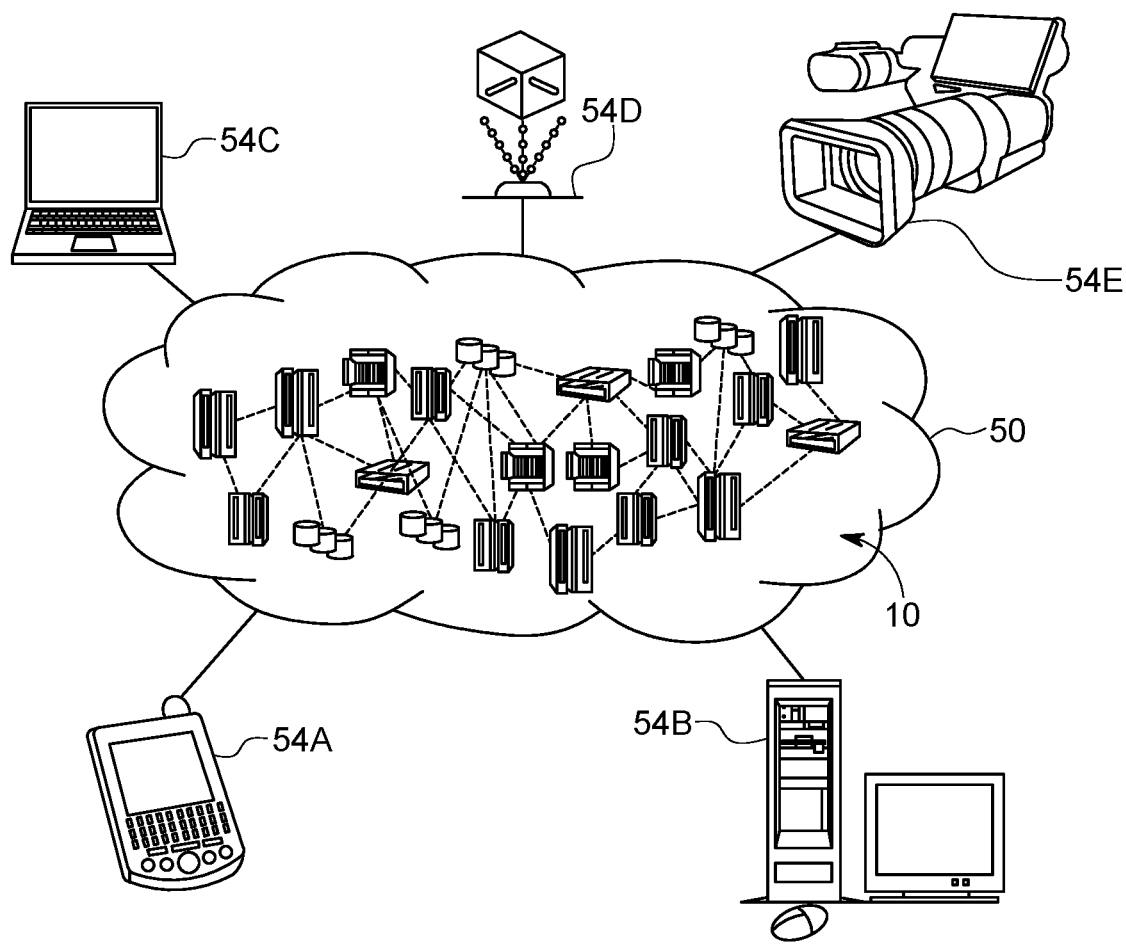
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, holographic display 54D, and/or sensor (e.g., a camera) 54E may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
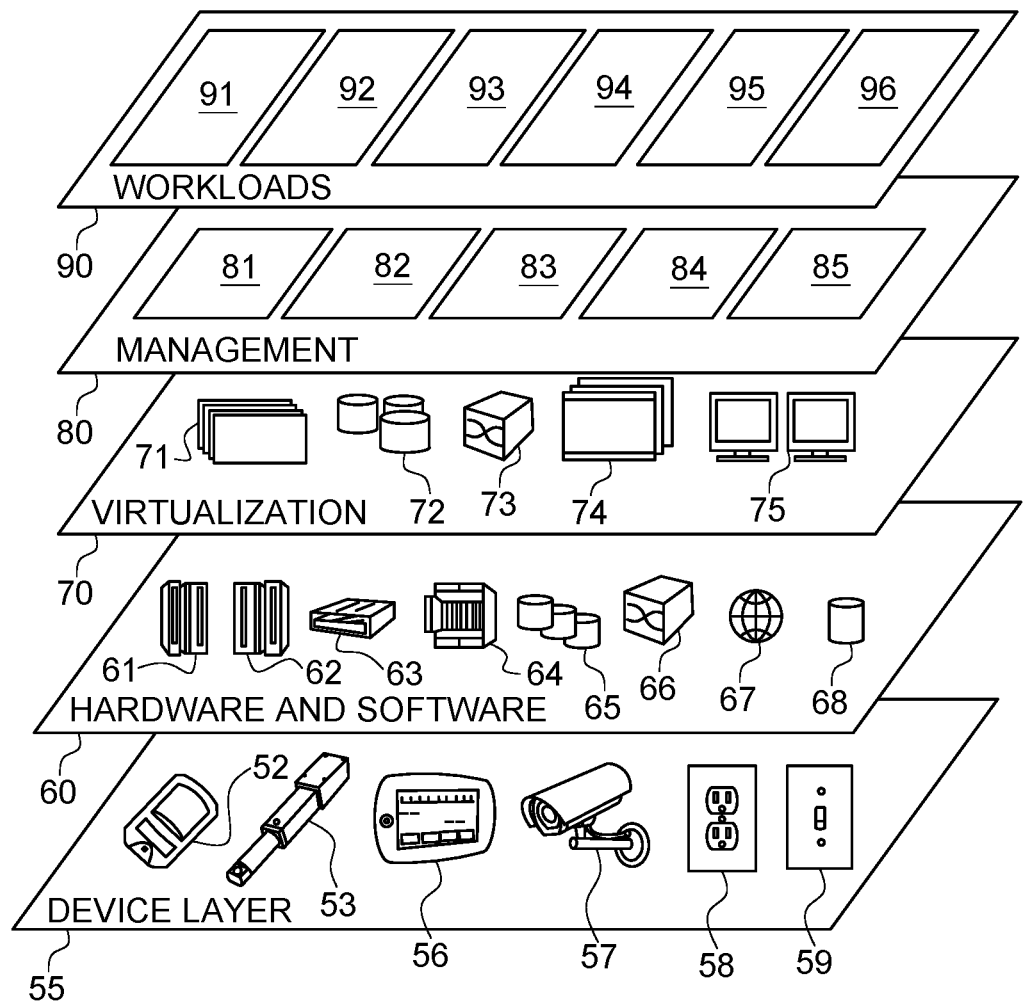
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, holographic displays, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for rendering holographic content as described herein. One of ordinary skill in the art will appreciate that the workloads and functions 96 for rendering holographic content may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for rendering holographic content by one or more processors. A security level associated with holographic content is determined (or retrieved, received, etc.). A security clearance associated with a viewer within a proximity of a holographic display is determined (or retrieved, received, etc). The holographic content is caused to be rendered in a first mode or a second mode by the holographic display based on the determined security level associated with the holographic content and the determined security clearance associated with the viewer (e.g., based on a comparison of the security level associated with the holographic content and the security clearance associated with the viewer).

When the holographic content is caused to be rendered in the second mode by the holographic display, the holographic content may be obscured from view of the viewer compared to when the holographic content is caused to be rendered in the first mode by the holographic display. In other words, in some embodiments, when the viewer is not authorized to view the holographic content, the holographic content may be more difficult for the viewer to see in the second mode compared to the first mode.

A security clearance associated with a second viewer within a proximity of the holographic display may (also) be determined. When the holographic content is caused to be rendered in the second mode by the holographic display, the holographic content may not be obscured from view of the second viewer compared to when the holographic content is caused to be rendered in the first mode by the holographic display. In other words, in some embodiments, when the (second) viewer is authorized to view the holographic content, the ease with which the (second) viewer can see the holographic content may be the same in the first mode and the second mode.

The causing of the holographic content to be rendered in the second mode by the holographic display may include causing a holographic object (e.g., a holographic obfuscation or obstruction) to be rendered between the holographic content and the viewer. Movement of the viewer may be detected. The holographic object may be caused to move based on said detected movement of the viewer.

The causing of the holographic content to be rendered in the second mode by the holographic display may include causing the holographic content to be rendered in at least one of a different position or a different size compared to when the holographic content is caused to be rendered in the first mode by the holographic display. In other words, in some embodiments, the size and/or position of the holographic content may (also) be altered to make it more difficult for unauthorized viewers to see.

Figure 4:
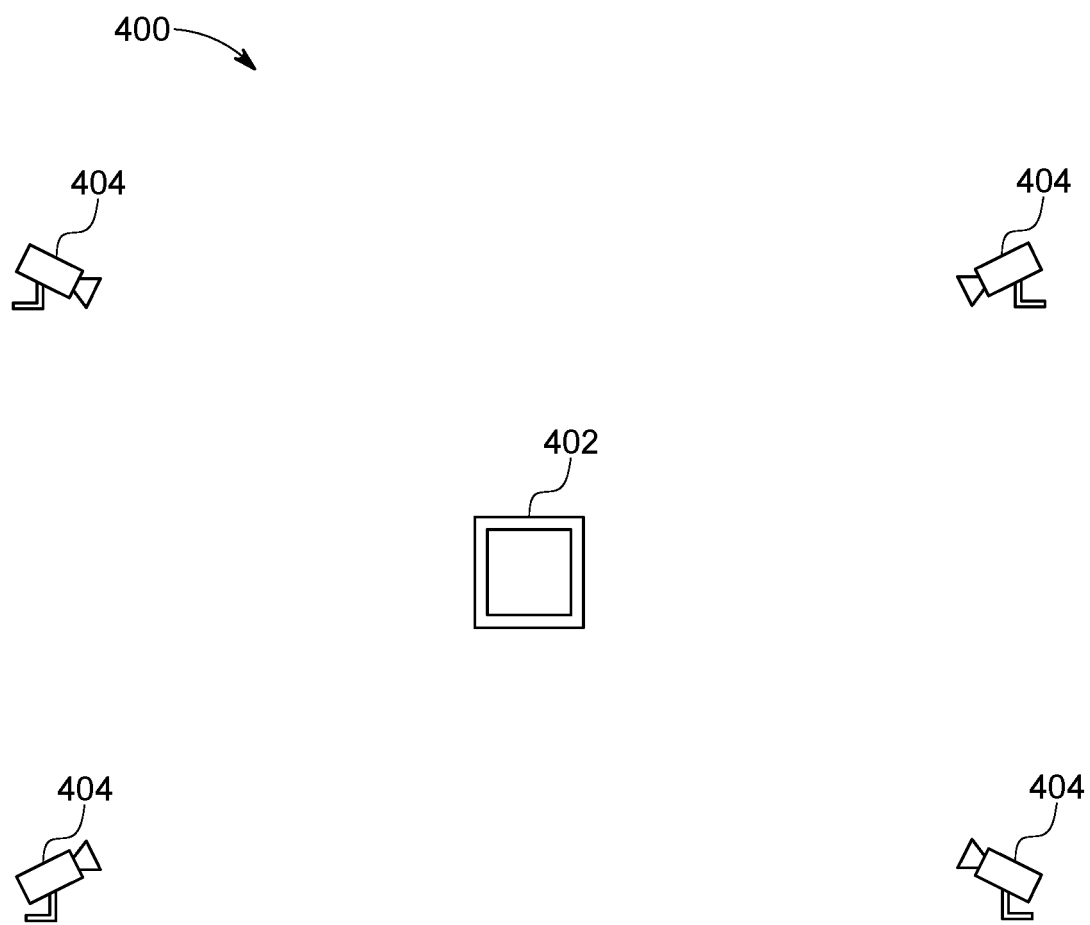
FIG. 4 is a plan view/block diagram of a system for rendering holographic content according to an embodiment of the present invention.

Referring now to FIG. 4, a system (and/or location) 400 in which embodiments described herein may be implemented is illustrated. Shown in FIG. 4 are a holographic display 402 and sensors 404. The system (and/or location) 400 may correspond to any environment in which the methods and systems described herein may be implemented. As one example, the system 400 may be implemented within an office/workplace type environment (e.g., an office building in which the holographic display 402 and the sensors 404 are (relatively) permanently installed). However, as described below, in some embodiments, the holographic display 402 and the sensors 404 may be implemented in a single computing device (or system) which may be portable (e.g., a laptop computer, a tablet, a cellular/smart phone, etc.). In such embodiments, the location 400 may correspond to any environment in which the computing device is utilized (e.g., an airport, a restaurant, a residence, a park, etc.).

The holographic display may be a computing device capable of generating three-dimensional (3D) holographic objects (or images) and/or otherwise rending holographic content, as is commonly understood. In some embodiments, the holographic display is a device (e.g., a computing device) dedicated to rendering holographic content (e.g., a "stand alone" holographic display). However, in some embodiments, the holographic display may be integrated into a computing system that may be utilized for other purposes as well (e.g., desktop computers, cellular phones, PDAs, tablets, etc.).

The sensors 404 may be any sensors, combination of sensors, and/or other devices configured to (and/or which may be utilized to) detect the presence of any individuals (e.g., people) within a proximity of the holographic display 402 (e.g., viewers and/or potential viewers of any content rendered by the holographic display 402) and/or determine a direction in which the individuals are gazing, the identity of the individuals, and/or a security clearance level associated with the individuals, as described below. Although multiple sensors 404 are shown in FIG. 4, it should be understood that in some embodiments, only a single sensor may be utilized.

Figure 5:
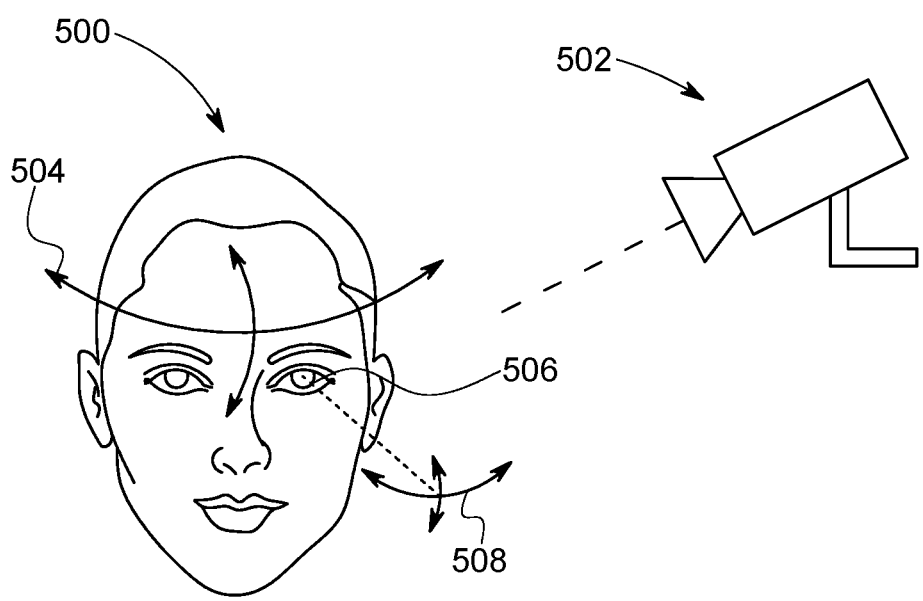
FIG. 5 is a side view of a head of an individual and a sensor according to an embodiment of the present invention.

FIG. 5 illustrates a face (and/or head) 500 of an individual (or person, viewer, potential viewer, etc.) and a sensor 502, which may be similar to those shown in FIG. 4. The sensor 502 may be, for example, any remote sensing device capable of (and/or utilized for) detecting the presence and/or position/location of the individual, the identity thereof (e.g., via facial recognition), and/or the orientation and/or movements of the face 500 and/or the eye(s) 506 of the individual, as indicated by arrow groups 504 and 508, respectively. For example, the sensor 502 may be an electromagnetic sensor, such as a camera, perhaps combined with an infrared light source.

In some embodiments, the sensors may be utilized to perform facial recognition and/or "emotion recognition." That is, the sensors (and/or any computing system utilized within the system) may be able to identify individuals to some extent (e.g., determine the particular identification or name of the individual, determine whether or not the individual is part of a predetermined group, such as an employee of a company, etc. based on facial structure) and/or recognize the facial expressions, eye movements, etc. of the individual to determine their emotional state or state of mind (e.g., whether or not the individual is concentrating on holographic content being rendered by a holographic display).

As will be appreciated by one skilled in the art, eye tracking may be implemented using, for example, optical methods. For example, light (e.g., visible and/or infrared) may be reflected from the eye (e.g., the cornea) and sensed by a video camera or some other optical sensor. The information is then analyzed to extract eye rotation from changes in reflections. Additionally, the pupil movement/parameters may be mapped to screen coordinates using generalized regression neural networks (GRNNs). With GRNNs, the mapping may not need to be an analytical function, and head movement may be explicitly accounted for by the gaze mapping function.

However, it should be understood that other types of devices (or sensors or systems) may be utilized to determine, for example, the presence, location, and/or identity of individuals in the embodiments disclosed herein. Other examples include infrared sensors, motion sensors, microphones, etc. Although not shown in detail, the sensors may include actuators (e.g., electric motors, pistons, etc.) configured to move (e.g., rotate and/or translate) the sensors 404 and/or control the direction(s) in which the sensors 404 are directed (or "aimed").

Additionally, in some environments, such as an office, individuals may be provided with a badge or some sort of electronic device that indicates their identification in some manner (e.g., a visitor as opposed to an employee) and may be "tracked" (e.g., via radio-frequency identification (RFID)) so that the system (and/or authorized personnel) may monitor their exact location in the office. As another example, the individuals' locations may be determined by the presence/location of an electronic device, such as a mobile phone, tablet computer, etc. (e.g., the presence/location of the individual's electronic device).

Figure 6:
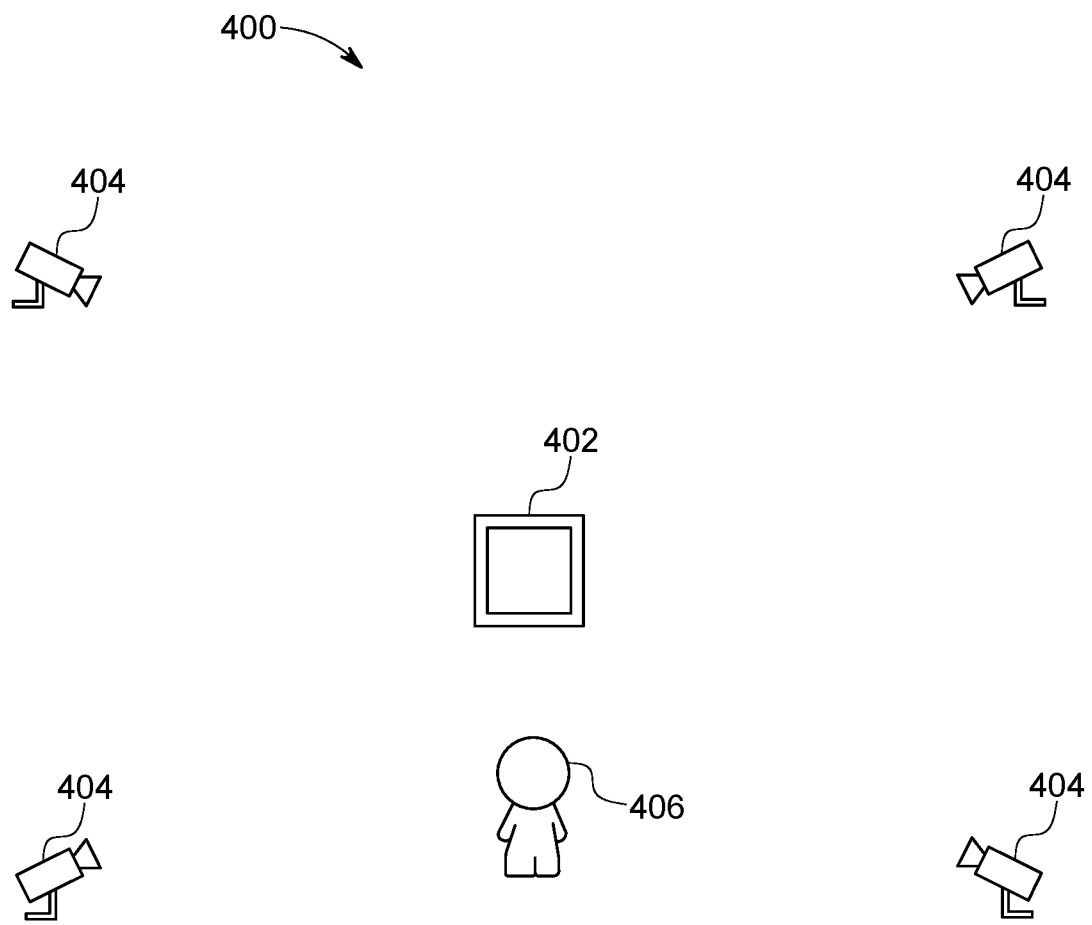
FIGS. 6-15 are plan views/block diagrams and isometric views of the system of FIG. 4 illustrating the operation thereof according to embodiments of the present invention.

Referring now to FIG. 6, the system (or location) 400 is shown with a primary viewer 406 near the holographic display 402. It should be understood that the presence of the primary viewer 406 (i.e., within a predetermined distance, such as several meters) may be detected utilizing the sensors 404 as described above. Alternatively, the primary viewer 406 may correspond to an individual that has initiated the operation of the holographic display 402 and/or an individual who is the intended viewer and/or an "authorized viewer" of a selected piece (or pieces) of holographic content. As such, in some embodiments, the rendering of holographic content may be initiated before the primary viewer 406 (and/or any other viewers) is within proximity of the holographic display.

Figure 7:
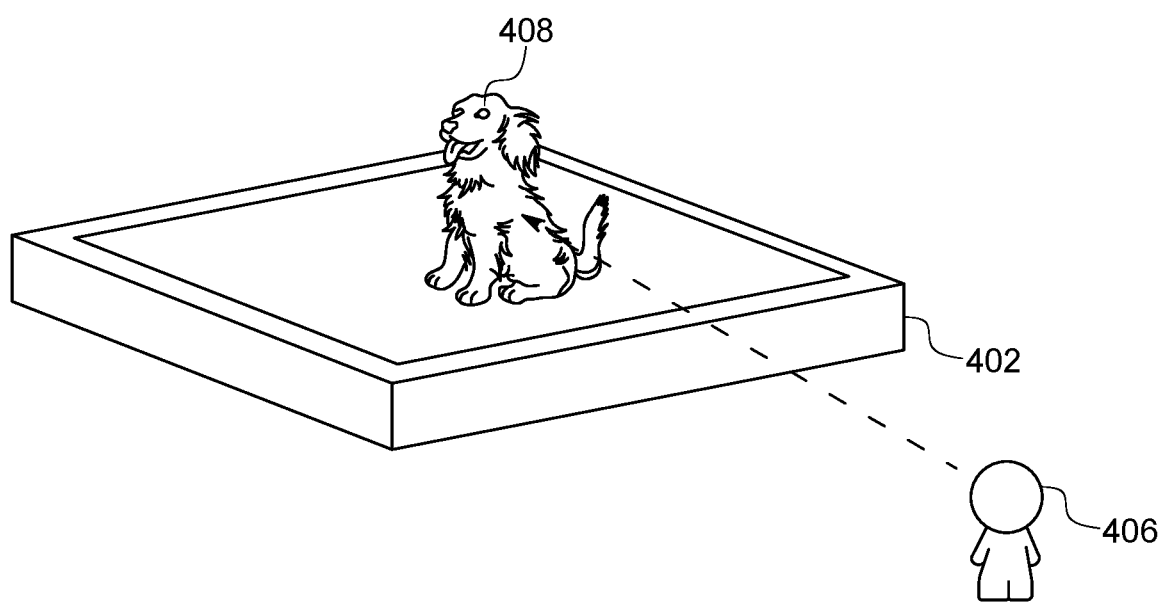

FIG. 7 illustrates the holographic display 402 in greater detail, as it is rendering holographic content 408. In the depicted embodiment, the holographic content 408 is a holographic object. However, it should be understood that the holographic content 408 may be in other forms, such as text, graphs, images, etc.

In some embodiments, a security level of the holographic content 408 is determined (and/or received, retrieved, etc.) and compared to a security clearance of the primary viewer 406 (and/or any other viewers within proximity of the holographic display, as described in greater detail below). As such, the holographic content 408 may include (and/or have associated therewith) some form of information (e.g., tags, metadata, a summary, notes, etc.) that indicates a security level (or condition) for the holographic content, which may dictate a security clearance that is "necessary" or "required" for an individual (or viewer) to view the content. Such information may be manually added to the content (e.g., by the individual/group creating the content, an administrator of the content, etc.). However, in some embodiments, the security level associated with the content may be determined using a sensor. For example, a camera may be used by a computing device and/or appropriate personnel to identify the security level of the content (e.g., a computing device may automatically recognize the content as including sensitive information based on, for example, a shape and/or the type of content).

In the embodiment depicted in FIGS. 6 and 7, the primary viewer 406 has been identified as an "authorized viewer" (e.g., the security clearance of the primary viewer 406 has been determined to be appropriate for the primary viewer 406 to view the holographic content 408). For example, in an office or workplace environment, the primary viewer 406 may be identified as an employee of the particular company (i.e., an employee with a security clearance appropriate for the particular holographic content 408). As another example, in an embodiment in which the system 400 is implemented within a mobile electronic device (e.g., a cellular telephone), the primary viewer 406 may be identified (e.g., via facial recognition, voice authentication, a password, etc.) as the owner of the mobile device.

Thus, the holographic content 408 is rendered by the holographic display 402 in what may be referred to as a "standard" or "regular" manner (i.e., in a first mode). In particular, the holographic content 408 is rendered in such a way that it is not obfuscated or obstructed in any way, such as in a way that would make it more difficult for the primary viewer 406 to view it.

Figure 8:
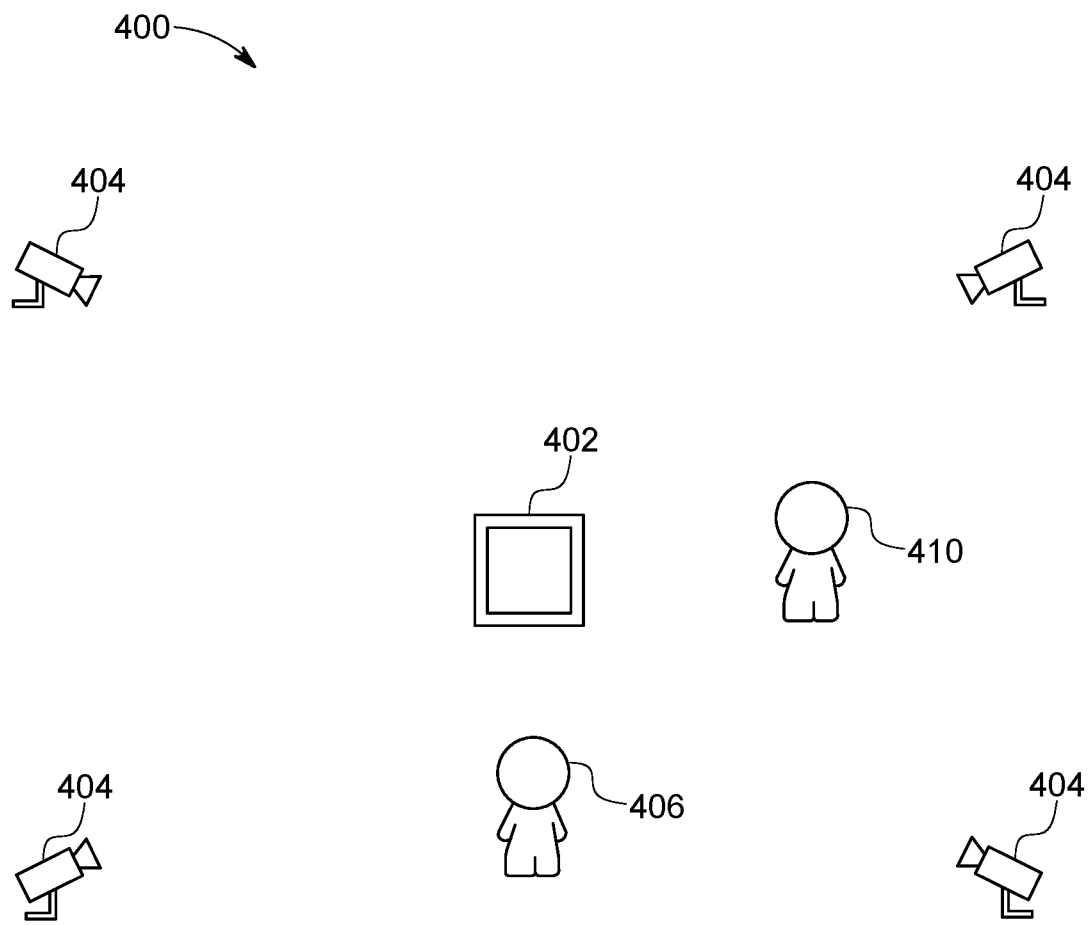

FIG. 8 illustrates the system 400 with the presence of a secondary viewer 410 having been detected, along with that of the primary viewer 406. In some embodiments, if particular conditions are met, the holographic display 402 renders holographic content in such a way that it is obfuscated or obstructed (e.g., made more difficult to see) from the view of at least one viewer (or potential viewer) (i.e., in a second mode). For example, in the depicted embodiment, if the secondary viewer 410 has been determined to be a potential viewer of holographic content rendered by the holographic display 402 (e.g., the secondary viewer 410 is within a predetermined distance of the holographic display 402, has a clear line of sight to the holographic display 402, and/or has been determined to be gazing towards the holographic display 402), and the secondary viewer 410 has been determined to be an "unauthorized viewer" of the content rendered by the holographic display 402, the holographic content 408 is rendered in such a way that it is obfuscated or obstructed from the view of (at least) the secondary user 410.

As one example, in an office or workplace setting, if the secondary viewer 410 is not recognized as an employee of the company (e.g., a visitor without special security clearance), the secondary viewer 410 may be determined to be an unauthorized viewer. As another example, in an embodiment in which the system 400 is implemented within a mobile electronic device (e.g., a cellular telephone), the secondary viewer 410 may be identified as being an individual other than the owner of the mobile device, and thus determined to be an unauthorized viewer.

Figure 9:
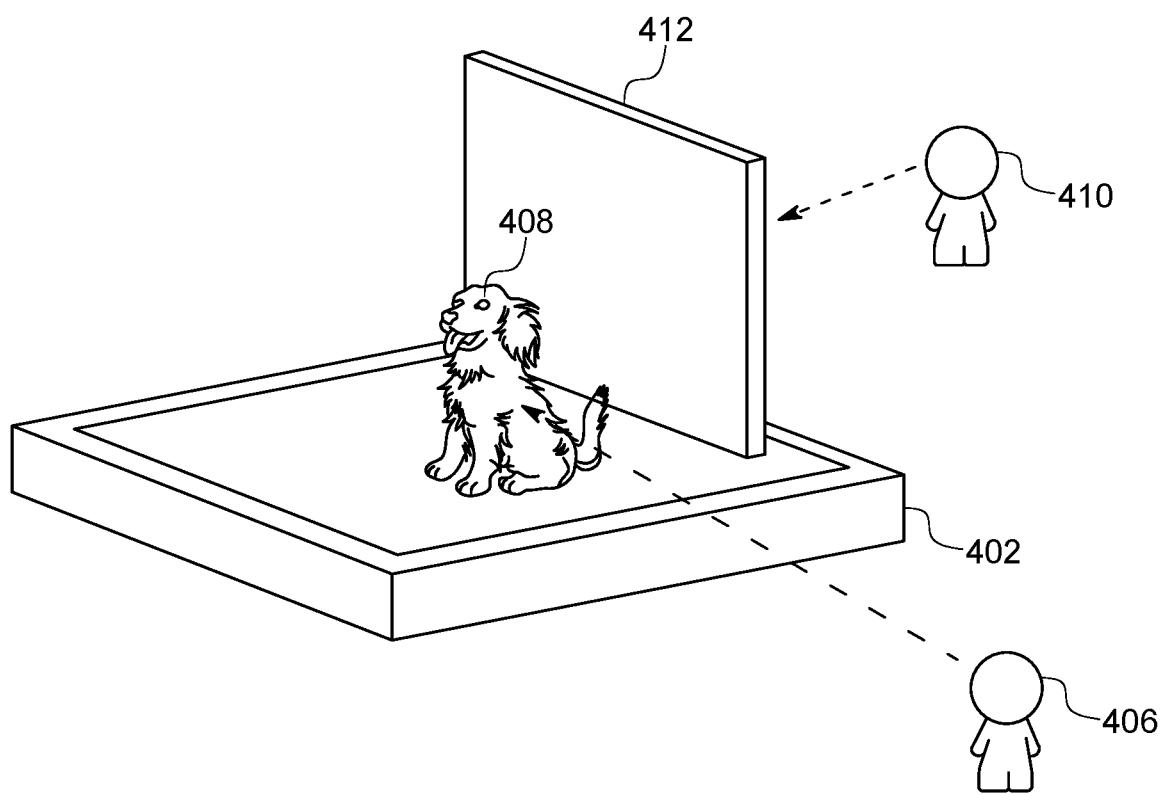

An example of rendering the holographic content 408 in such a way that it is obfuscated or obstructed from the view of at least some viewers is shown in FIG. 9. As shown, the holographic display 402 is rendering the holographic content 408 itself in a manner similar to that shown in FIG. 7. However, the holographic display 402 is also rendering (or generating) a holographic obstruction 412. In particular, the holographic obstruction 412 is rendered between (e.g., directly between) the holographic content 408 and the secondary viewer 410. As such, the holographic obstruction 412 obstructs or obfuscates the secondary viewer's 410 view of the holographic content 408 (i.e., the holographic obstruction 412 makes the holographic content 408 more difficult for the secondary viewer 410 to see). However, it should be noted that, at least in the embodiment shown in FIG. 9, no portion of the holographic obstruction 412 is between the holographic content 408 and the primary viewer 406. As such, the holographic obstruction 412 does not obfuscate or obstruct the holographic content 408 from the view of the primary viewer 406.

In the embodiment shown in FIG. 9, the holographic obstruction 412 is in the shape of a "wall" or "shield." However, it should be understood that other shapes (and sizes) may be used. Additionally, in some embodiments, rather than a relatively simple shape used solely for the purpose of obstructing the view of the holographic content 408, the holographic obstruction 412 may take the form of (additional) holographic content (e.g., holographic content with a security level appropriate for the secondary viewer 410).

Figure 10:
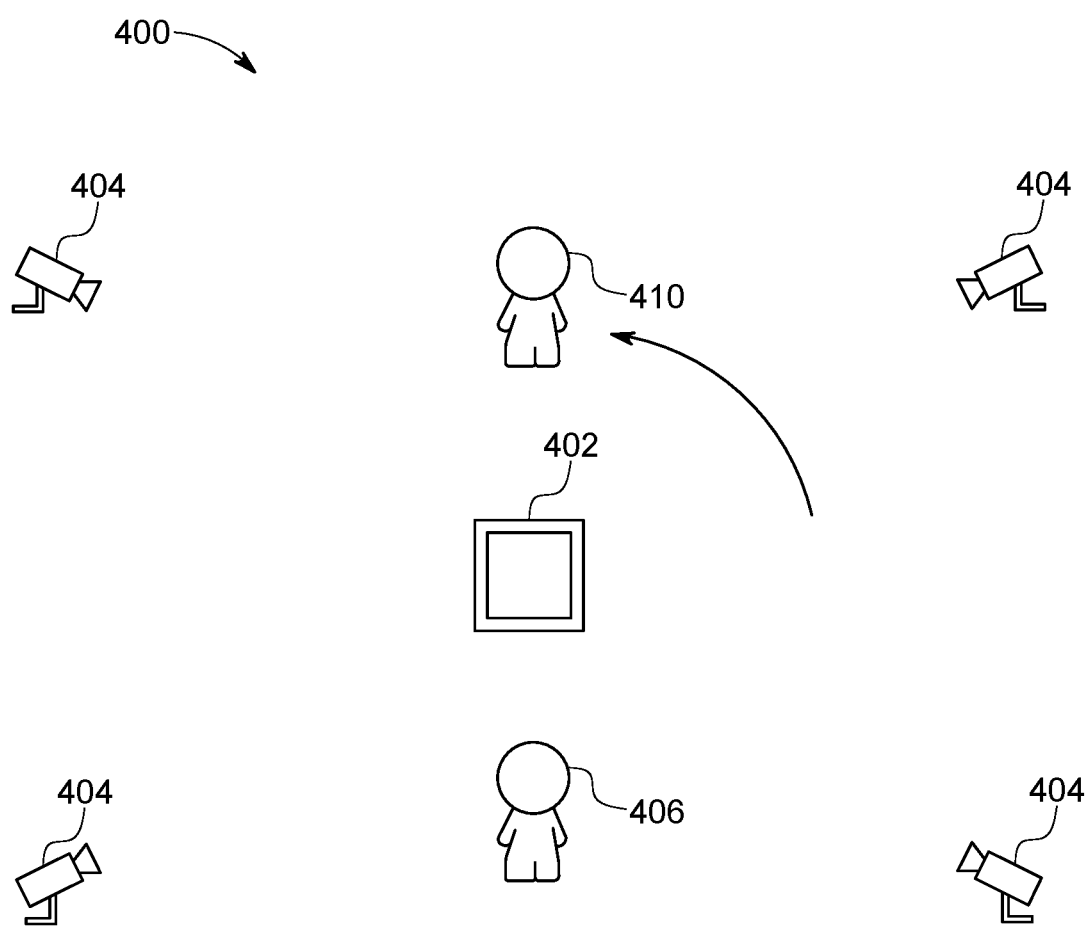
Figure 11:
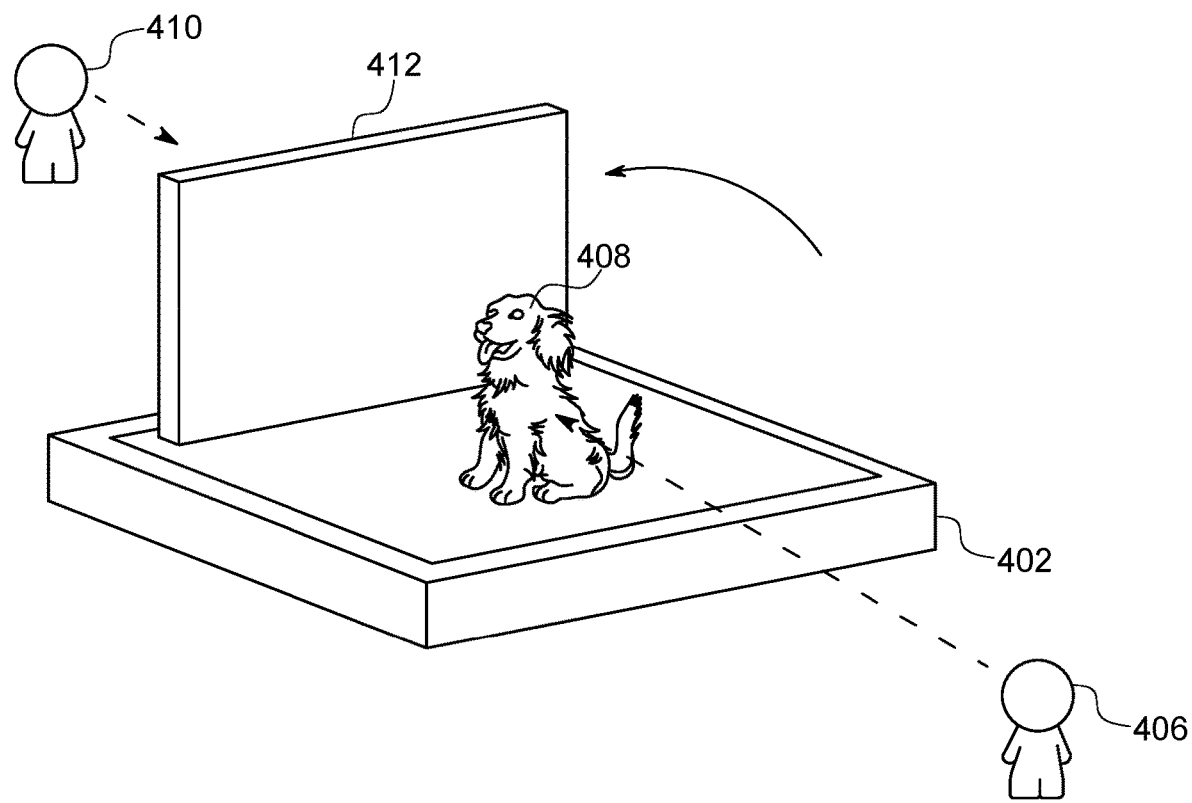

In some embodiments, the position/location of the viewers is monitored while the holographic content is being rendered and any appropriate changes to the manner/mode in which the content is displayed are made. For example, referring now to FIG. 10, the secondary viewer 410 is detected as moving from a first side of the holographic display 402 to a second side of the holographic display 402. In the event that the secondary viewer 410 is still considered to be a potential viewer/security concern, the holographic obstruction 412 may be moved in an appropriate manner to "track" or "follow" the movements of the secondary viewer 410 such that the holographic obstruction 412 remains between (or substantially between) the holographic content 408 and the secondary viewer 410, as shown in FIG. 11. As such, the holographic content 408 may remain obstructed from the view of the secondary viewer 410 while, for example, not be obstructed from the view of the primary viewer 406.

Figure 12:
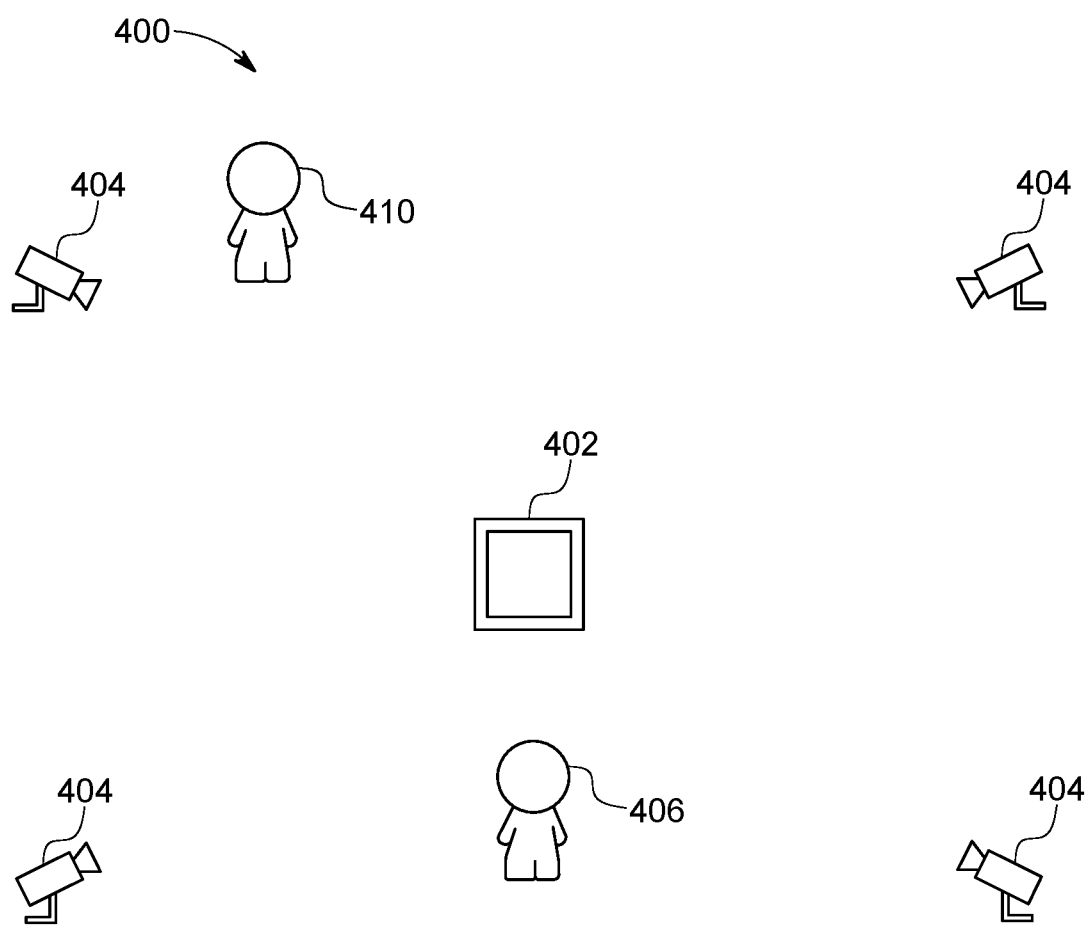
Figure 13:
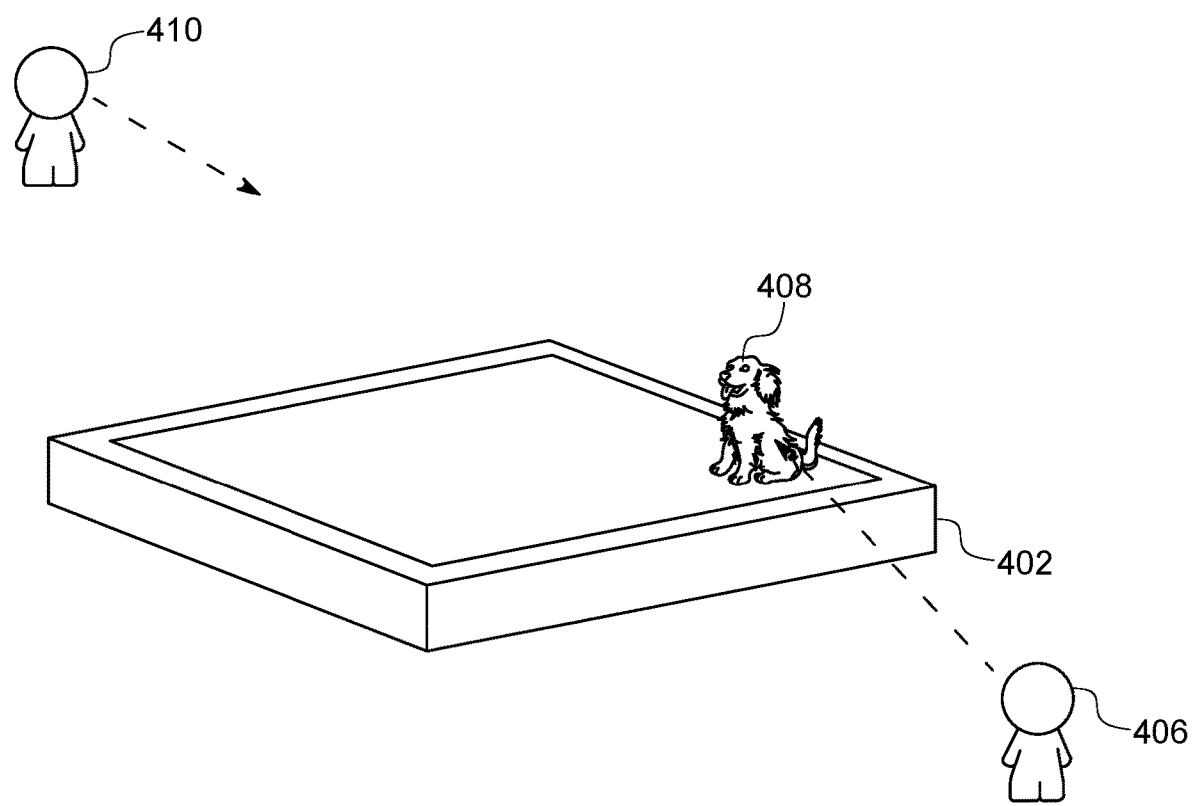

In some embodiments, depending on, for example, the type of holographic content being displayed and/or the distance between the various viewers and the holographic display 402, rather than generating a holographic obstruction, the size and/or position of the holographic content may be altered to make it more difficult for specific viewers (or potential viewers) to see. For example, in FIG. 12, the secondary viewer 410 (i.e., an unauthorized viewer) is shown as being in a position that is farther from the holographic display 402 than that of the primary viewer 406 (i.e., an authorized viewer). In response, as shown in FIG. 13, rather than generating a holographic obstruction, the holographic content 408 has been reduced in size and rendered on a portion of the holographic display 402 that is closer to the position of the primary viewer 406 and farther from that of the secondary viewer 410 (i.e., as compared to the size and position of the holographic content 408 shown in FIGS. 7, 9, and 11). As a result, the holographic content 408 has been made relatively difficult for the secondary viewer 410 to see while not being significantly obfuscated from the view of the primary viewer 406. As another example, in the event that the holographic content is a two-dimensional image (or text), the image may be rotated (and/or displayed) so that an edge of the image is directed towards the secondary viewer 410 (i.e., the image may be displayed to "face away" from the secondary viewer 410).

Figure 14:
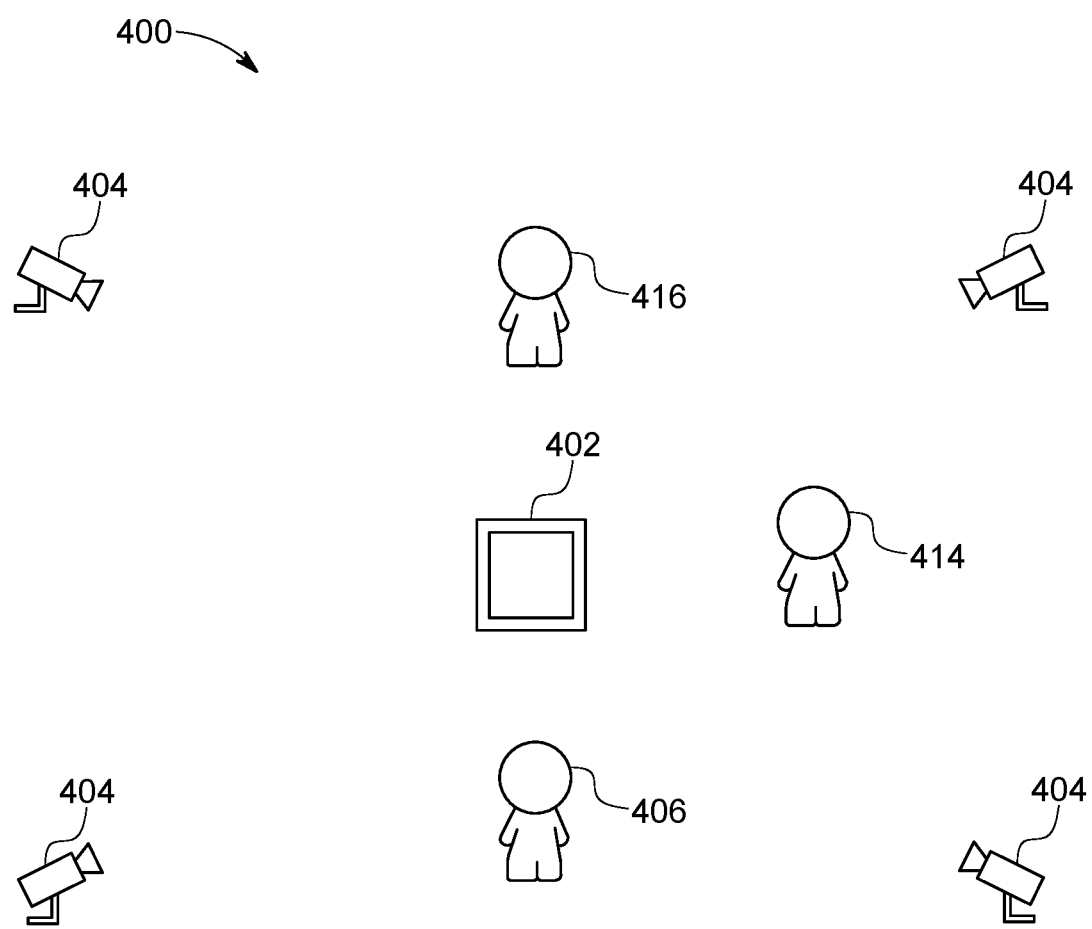
Figure 15:
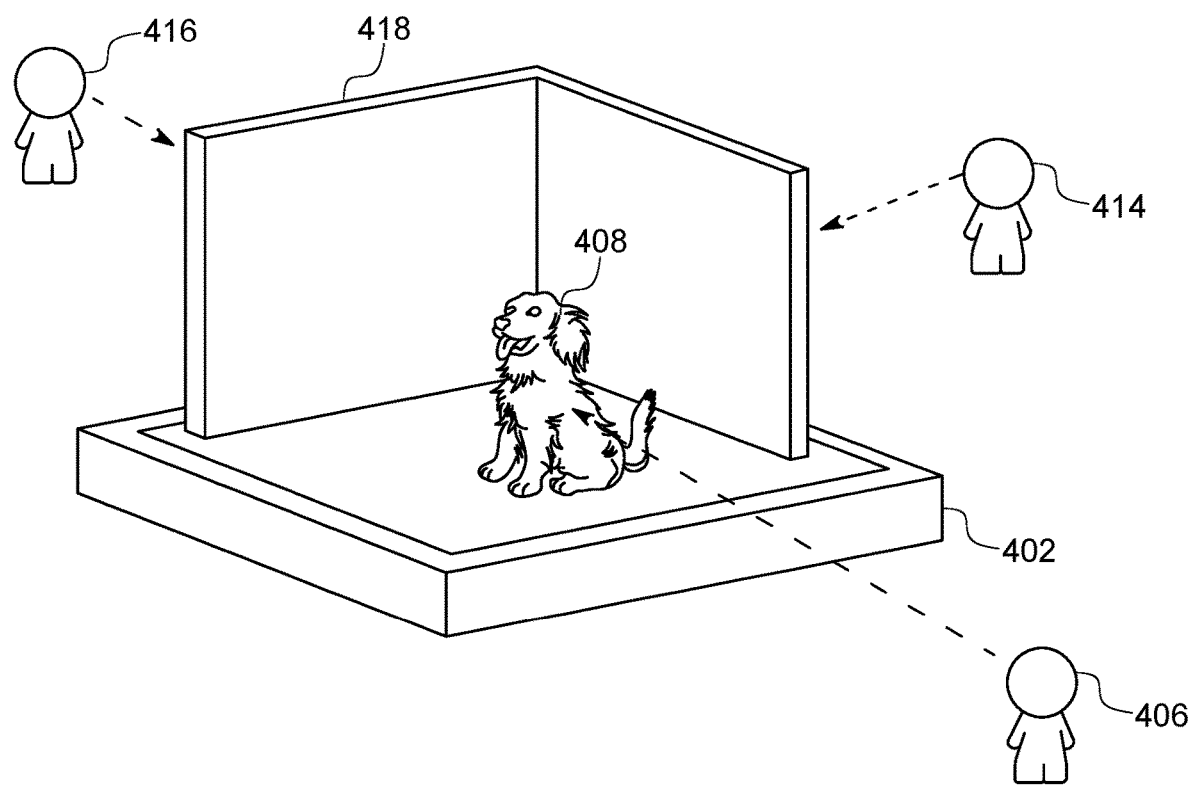

In the embodiment shown in FIG. 14, multiple secondary viewers, 414 and 416, have been detected as being potential viewers of holographic content rendered by the holographic display 402 while, for example, the primary viewer 406 is still present. It should be noted that secondary viewer 414 and secondary viewer 416 are positioned on different sides of the holographic display 402. In such a situation, in some embodiments, if both secondary viewer 414 and secondary viewer 416 are determined to be unauthorized to view the holographic content 408, multiple and/or more complex holographic obstructions may be rendered. An example of this is shown in FIG. 15. As shown, a "two sided" or "two piece" holographic obstruction 418 (e.g., a two portion "wall") has been generated such that the view of the holographic content 408 is obstructed from multiple sides/angles. In particular, in the example shown in FIG. 15, a first portion of the holographic obstruction 418 is positioned between (e.g., directly between) the holographic content 408 and secondary viewer 414, and a second portion of the holographic obstruction 418 is positioned between the holographic content 408 and secondary user 416. As such, the holographic content 408 is obstructed from the view of both of the secondary viewers 414 and 416 while, for example, not being obstructed from the view of the primary viewer 406 (i.e., an authorized viewer).

In embodiments in which a holographic obstruction(s) (e.g., a simple shape/object and/or additional holographic content) is utilized, the transparency, intensity, and/or color of the holographic obstruction (and/or the holographic content) may be adjusted/controlled in such a way as to make it easier for authorized viewers to see the holographic content and/or make it more difficult for unauthorized viewers to see the holographic content. In some embodiments, a user (e.g., an authorized viewer, an administrator, etc.) is provided with an indication/alert (e.g., a visual signal, an electronic message, such as a text message or email, a noise, etc.) when unauthorized viewers are detected (i.e., regardless of whether or not the content is rendered in the second mode). The indication/alert may be provided within the content being rendered by the holographic display (e.g., the rendered content may be altered in such a way that the authorized viewer(s) is made aware of the unauthorized viewer(s)).

It should also be understood that the methods and systems described herein may be applicable to other types of display devices besides holographic displays. For example, with a flat panel display, such as a liquid-crystal display (LCD) or active-matrix organic light-emitting diode (AMOLED) display, the content may be similarly rendered in different modes based on the detected presence of (unauthorized) viewers (e.g., the size and/or position of the content on the display may be changed, "layers" of visible obstructions may be added to the content to make it difficult for viewers who are not within a very close proximity of the display to view the content, etc.).

Figure 16:
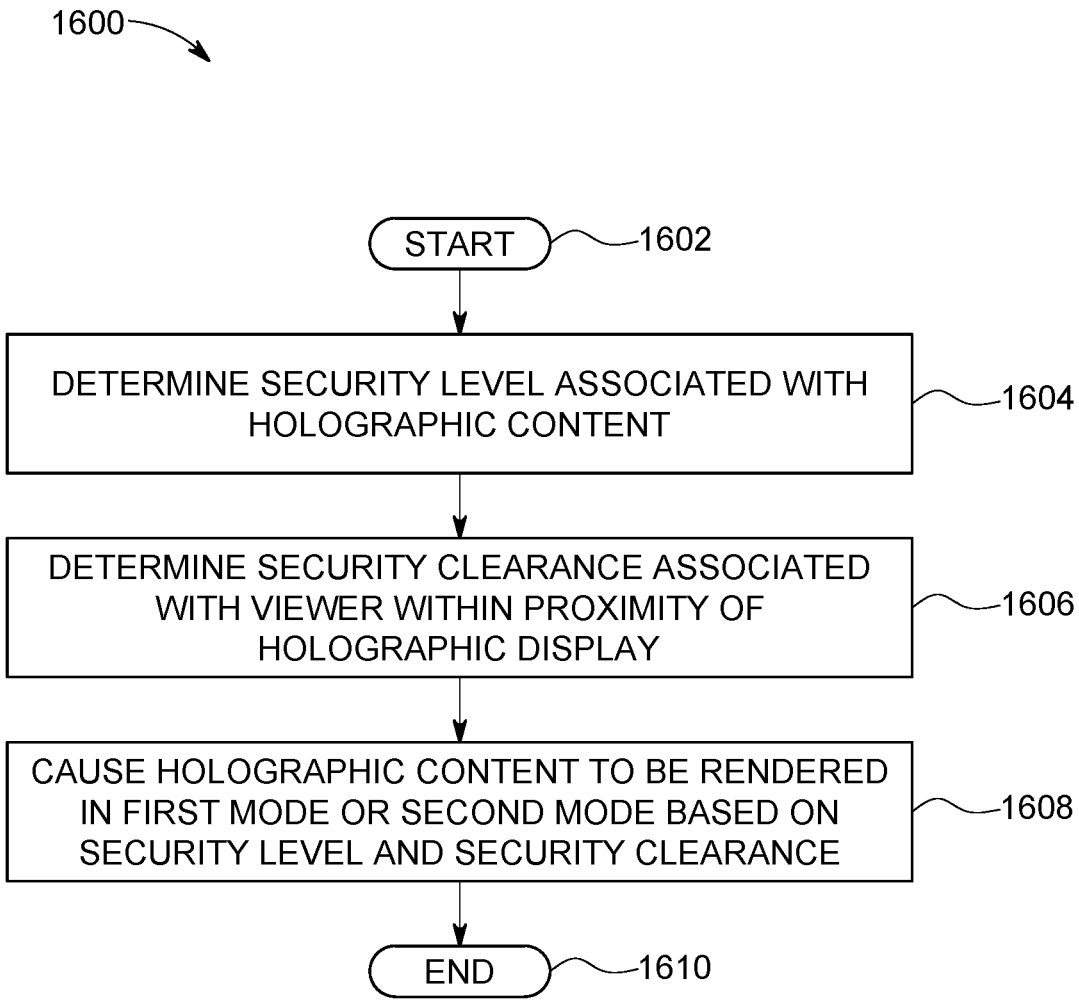
FIG. 16 is a flowchart diagram depicting an exemplary method for rendering holographic content in which various aspects of the present invention may be implemented.

Turning to FIG. 16, a flowchart diagram of an exemplary method 1600 for rendering holographic content, in accordance with various aspects of the present invention, is illustrated. Method 1600 begins (step 1602) with, for example, holographic content (e.g., a holographic object, text, etc.) being selected to be rendered by a holographic display and/or the rendering of holographic content by a holographic display being initiated.

A security level (or condition) associated with the holographic content is determined (or received or retrieved) (step 1604). For example, the holographic content may include some form of information (e.g., tags, metadata, a summary, notes, etc.) that indicates a security level (or condition) associated with the holographic content.

A security clearance associated with a viewer (or potential viewer) within a proximity of the holographic display is determined (or received or retrieved) (step 1606). For example, various devices (e.g., sensors) may be utilized to determine the presence of an individual (or multiple individuals) within a predetermined distance of the holographic display and/or the direction in which the individual is gazing. If the individual is determined to be a potential viewer of the content (i.e., when rendered by the holographic display), a security clearance associated with the individual(s) is determined (e.g., based on the identity of the individual(s)).

The security level associated with the holographic content is compared to the security clearance associated with the individual(s). Based on the comparison, the holographic content is rendered by the holographic display in a first mode or a second mode (step 1608). When the holographic content is rendered in the first mode, the holographic content is not obscured from the view of the viewer (or individual). When the holographic content is rendered in the second mode, the holographic content is obscured from the view of the viewer (e.g., the holographic content is more difficult for the viewer to see when rendered in the second mode compared to the first mode). As described above, rendering the holographic content in the second mode may include generating holographic obstructions, rendering additional holographic content (e.g., having a lower security level), and/or changing the size and/or position in which the holographic content is rendered by the holographic display.

Method 1600 ends (step 1610) with, for example, the termination of the rendering of the holographic content (e.g., the end of a presentation or the holographic display being powered off). However, it should be understood that method 1600 may be reinitiated each time holographic content is to be rendered by the holographic display and/or each time individuals (or potential viewers) are being detected within proximity of the holographic display while holographic content is being rendered.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for rendering holographic content, comprising:
   determining a security level associated with holographic content;
   determining a security clearance associated with a viewer within a proximity of a holographic display;
   causing the holographic content to be rendered in a first mode or a second mode by the holographic display based on the determined security level associated with the holographic content and the determined security clearance associated with the viewer; wherein causing the holographic content to be rendered in the second mode by the holographic display includes causing a holographic object to be rendered between the holographic content and the viewer;
   detecting movement of the viewer; and
   causing movement of the holographic object based on the detected movement of the viewer such that, in the second mode, the holographic object is rendered at a position in three-dimensional space so as to be continually maintained between the holographic content and the viewer as the viewer moves.

2. The method of claim 1, wherein when the holographic content is caused to be rendered in the second mode by the holographic display, the holographic content is obscured from view of the viewer compared to when the holographic content is caused to be rendered in the first mode by the holographic display.

3. The method of claim 2, further comprising determining a security clearance associated with a second viewer within a proximity of the holographic display.

4. The method of claim 3, wherein when the holographic content is caused to be rendered in the second mode by the holographic display, the holographic content is not obscured from view of the second viewer compared to when the holographic content is caused to be rendered in the first mode by the holographic display.

5. The method of claim 2, wherein causing the holographic content to be rendered in the second mode by the holographic display includes causing the holographic content to be rendered in at least one of a different position or a different size compared to when the holographic content is caused to be rendered in the first mode by the holographic display.

6. A system for rendering holographic content, comprising:
   at least one processor that
      determines a security level associated with holographic content;

determines a security clearance associated with a viewer within a proximity of a holographic display;

causes the holographic content to be rendered in a first mode or a second mode by the holographic display based on the determined security level associated with the holographic content and the determined security clearance associated with the viewer; wherein causing the holographic content to be rendered in the second mode by the holographic display includes causing a holographic object to be rendered between the holographic content and the viewer;

detects movement of the viewer; and causes movement of the holographic object based on the detected movement of the viewer such that, in the second mode, the holographic object is rendered at a position in three-dimensional space so as to be continually maintained between the holographic content and the viewer as the viewer moves.

7. The system of claim 6, wherein when the holographic content is caused to be rendered in the second mode by the holographic display, the holographic content is obscured from view of the viewer compared to when the holographic content is caused to be rendered in the first mode by the holographic display.

8. The system of claim 7, wherein the at least one processor further determines a security clearance associated with a second viewer within a proximity of the holographic display.

9. The system of claim 8, wherein when the holographic content is caused to be rendered in the second mode by the holographic display, the holographic content is not obscured from view of the second viewer compared to when the holographic content is caused to be rendered in the first mode by the holographic display.

10. The system of claim 7, wherein causing the holographic content to be rendered in the second mode by the holographic display includes causing the holographic content to be rendered in at least one of a different position or a different size compared to when the holographic content is caused to be rendered in the first mode by the holographic display.

11. A computer program product for rendering holographic content by one or more processors, the computer program product comprising a non-transitory computer-readable storage medium having computer-readable program code portions stored therein, the computer-readable program code portions comprising:

an executable portion that determines a security level associated with holographic content;

an executable portion that determines a security clearance associated with a viewer within a proximity of a holographic display;

an executable portion that causes the holographic content to be rendered in a first mode or a second mode by the holographic display based on the determined security level associated with the holographic content and the determined security clearance associated with the viewer; wherein causing the holographic content to be rendered in the second mode by the holographic display includes causing a holographic object to be rendered between the holographic content and the viewer;

an executable portion that detects movement of the viewer; and an executable portion that causes movement of the holographic object based on the detected movement of the viewer such that, in the second mode, the holographic object is rendered at a position in three-dimensional space so as to be continually maintained between the holographic content and the viewer as the viewer moves.

12. The computer program product of claim 11, wherein when the holographic content is caused to be rendered in the second mode by the holographic display, the holographic content is obscured from view of the viewer compared to when the holographic content is caused to be rendered in the first mode by the holographic display.

13. The computer program product of claim 12, wherein the computer-readable program code portions further include an executable portion that determines a security clearance associated with a second viewer within a proximity of the holographic display.

14. The computer program product of claim 13, wherein when the holographic content is caused to be rendered in the second mode by the holographic display, the holographic content is not obscured from view of the second viewer compared to when the holographic content is caused to be rendered in the first mode by the holographic display.

15. The computer program product of claim 12, wherein causing the holographic content to be rendered in the second mode by the holographic display includes causing the holographic content to be rendered in at least one of a different position or a different size compared to when the holographic content is caused to be rendered in the first mode by the holographic display.

* * * * *